United States Patent
Padawer

(10) Patent No.: US 10,114,798 B2
(45) Date of Patent: Oct. 30, 2018

(54) AUTOMATED CONTEXT-BASED UNIQUE LETTER GENERATION

(71) Applicant: Progrexion IP, Inc., North Salt Lake City, UT (US)

(72) Inventor: Justin Randall Padawer, Bountiful, UT (US)

(73) Assignee: Progrexion IP, Inc., North Salt Lake, UT (US)

(*) Notice: Subject to any disclaimer, the term of this patent is extended or adjusted under 35 U.S.C. 154(b) by 344 days.

(21) Appl. No.: 13/772,174

(22) Filed: Feb. 20, 2013

(65) Prior Publication Data

US 2014/0236574 A1    Aug. 21, 2014

(51) Int. Cl.
  *G06F 17/21*    (2006.01)
  *G06F 17/28*    (2006.01)

(52) U.S. Cl.
  CPC .......... *G06F 17/21* (2013.01); *G06F 17/2881* (2013.01)

(58) Field of Classification Search
  USPC .............................................................. 704/9
  See application file for complete search history.

(56) References Cited

U.S. PATENT DOCUMENTS

| | | | | |
|---|---|---|---|---|
| 2001/0034849 A1* | 10/2001 | Powers | ................ | G06Q 10/107 726/30 |
| 2006/0212810 A1* | 9/2006 | Segal | .................... | G06Q 10/06 715/234 |
| 2007/0214404 A1* | 9/2007 | Rehberg | ................ | G06F 17/274 715/205 |
| 2011/0178817 A1* | 7/2011 | Porter | ................... | G06F 19/328 705/2 |
| 2012/0023326 A1* | 1/2012 | Kalan | ................. | H04L 63/0428 713/156 |
| 2012/0254971 A1* | 10/2012 | Hu | .......................... | G06F 21/36 726/9 |

OTHER PUBLICATIONS

Scott Pakin: "Automatic complaint letter generator", Jun. 3, 2009 (Jun. 3, 2009), XP002728263, Retrieved from the Internet: URL: http://web.archive.org/web/20090603174413/http://www.pakin.org/compl al nt/ [retrieved on Aug. 5, 2014].

(Continued)

*Primary Examiner* — Shreyans A Patel
(74) *Attorney, Agent, or Firm* — Workman Nydegger

(57) ABSTRACT

The automated generation of a unique letter or unique letters using one or more context variables for the letter. The contextual variables may represent author characteristics, audience characteristics, tone, word diversification, letter type, and so forth. Different entropy may be used for each letter to thereby generate a unique letter even if the context for the letters is the same. Nevertheless, each unique letter is suitable for the given context. If desired, the automatically generated letter may be further edited, for example, for grammatical, word choice, or legal content. Thus, the letter may appear to be custom drafted by a human for the context, whereas the letter was entirely or substantially computer-generated.

20 Claims, 4 Drawing Sheets

(56) References Cited

OTHER PUBLICATIONS

Richard Power et al: Automatic generation of large-scale paraphrases, 3rd In-Ternational Workshop on Paraphrasing (1WP2005), Oct. 14, 2005 (Oct. 14, 2005), XP055133785, Sections 2 and 3.
Eduard H. Hovy: "Pragmatics and natural language generation", Artificial Intelligence, vol. 43, No. 2, May 1, 1990 (May 1, 1990), pp. 153-197, XP055133794, ISSN: 0004-3702, DOI: 10. 1016/0004 3702(90)90084-D section 2.2-2.
PCT/US2014/017346, Notification of Transmittal of the International Search Report and the Written Opinion of the International Searching Authority, or Declaration dated Aug. 20, 2014. (10 pages).

* cited by examiner

AUTOMATED CONTEXT-BASED UNIQUE LETTER GENERATION

BACKGROUND

The human mind is capable of formulating ideas both concrete and abstract. In order to record such ideas, human beings have historically written down their ideas using written language on a tangible medium. For instance, one common tangible medium is paper, which is still used in modern times. Using modern postal systems, written correspondence can be mailed over great distances allowing remote individuals to communicate.

In the computer age, human beings use computer systems in order to record written language on a computer-readable medium. Typically, the data representing such written language is stored in binary form, with a computer program (such as a word processor) representing such data in human readable form to a human being. To a human, the computer display simulates written correspondence such as a letter, paper, or the like. Such electronic writings may be digitally recorded as well as communicated using computer networks. Throughout this description, any type of written correspondence, whether recorded on a tangible or computer-readable medium, will be termed a "letter".

Human beings author letters as they are capable of complex thought and applying intelligence to formulate a wide variety of written language. For instance, a human being can receive instructions on a certain type of letter to write, a goal of the letter, and a context, and formulate a letter of that type aimed at accomplishing the goal in the designated context. If those instructions are provided to different human beings with the same goal and context, another human being might generate another unique letter aimed towards accomplishing the same goal in the context, but containing different semantic and sentence structures altogether.

Computer systems can generate written language. However, such written language is very deterministic, and not context-based, nor rhetorical. Accordingly, it is often easy to tell when a human being has authored written language, as compared to automatically generated written language. Furthermore, computer generated language is often template-based, and thus given a particular goal or context, a semantically similar letter is generated to the point where it is hardly unique.

BRIEF SUMMARY

At least one embodiment described herein relates to automated generation of a unique letter using one or more contextual variables for the letter. In this description, the term "letter" is defined as any written correspondence, whether recorded on a tangible or computer-readable medium. Different entropy may be used for each letter to thereby generate a unique letter even if the context for the letters is the same. Nevertheless, each unique letter is suitable for the given context. If desired, the automatically generated letter may be further edited, for example, for grammar, word choice, or legal content. Thus, the letter may appear to be custom drafted by a human for the context, whereas the letter was entirely or substantially computer-generated.

Letters that are perceived to be drafted by humans tend to be taken more seriously by the reader than letters that are perceived to be computer-generated. When natural, unique, letters are generated, they are more likely to appear to their readers to be entirely human-generated. However, human-drafted letters are more labor intensive than computer-generated letters. Accordingly, the principles described herein allow for the benefits of computer-efficiency in generating letters, while providing unique characteristics associated with human-generated letters.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least one embodiment described herein relates to the automated generation of a unique letter or unique letters using certain contextual variable(s) for the letter. The context variables may represent the purpose or goal of the letter, author characteristics, audience characteristics, tone, word diversification, and so forth. Different entropy may be used for each letter to thereby generate a unique letter even if the context for the letters is the same. Nevertheless, each unique letter is suitable for the given context. If desired, the automatically generated letter may be further edited, for example, for grammar, word choice, or legal content. Thus, the letter may appear to be custom drafted by a human in the given context, whereas the letter was entirely or substantially computer-generated. First, some introductory discussion regarding computing systems will be described with respect to FIG. 1. Then, the automated generation of letters will be described with respect to FIGS. 2 through 4 and a number of code examples.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
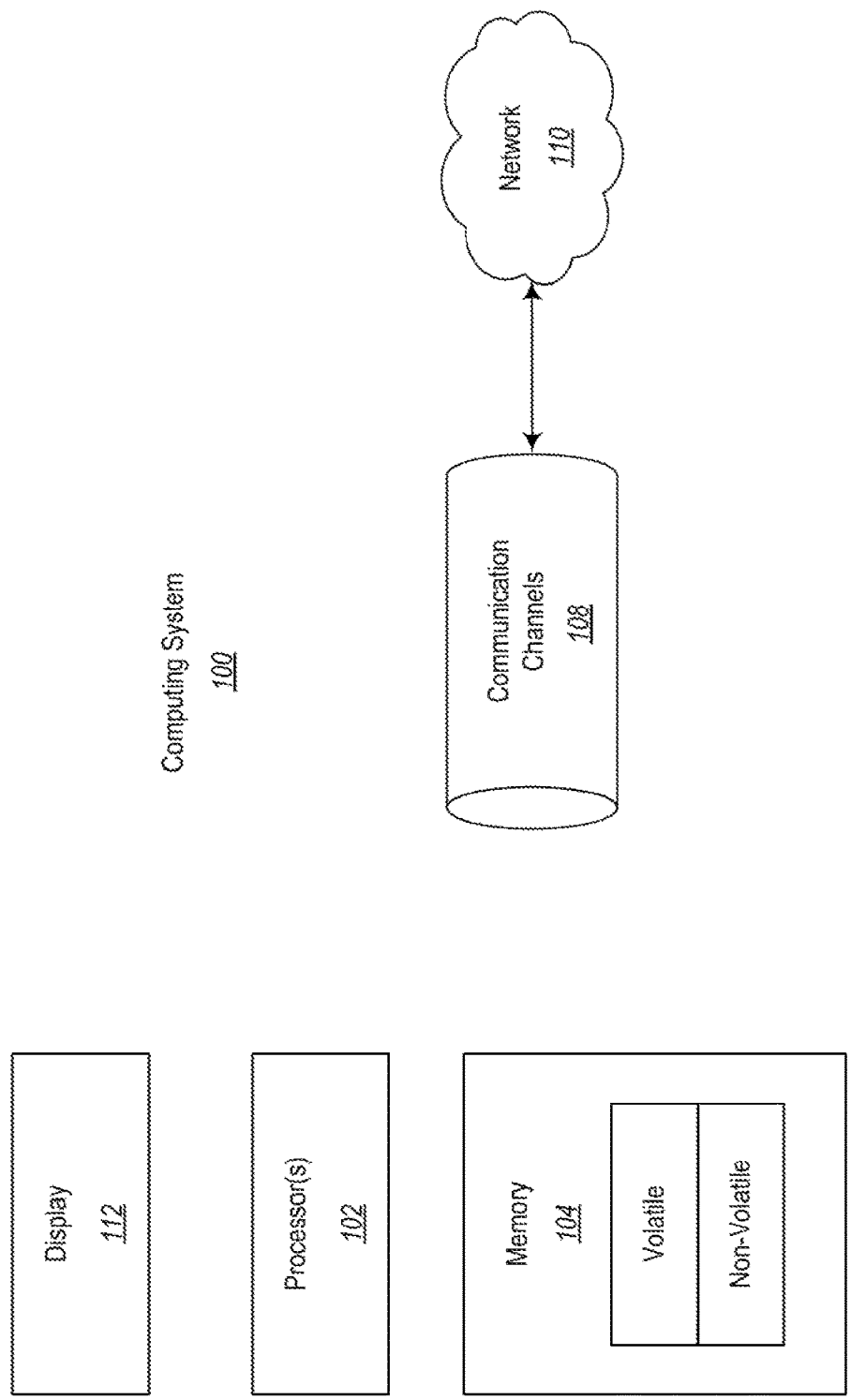
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. If interaction with the user is beneficial, the computing system 100 may also include a display 112 and potentially other input/output devices.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
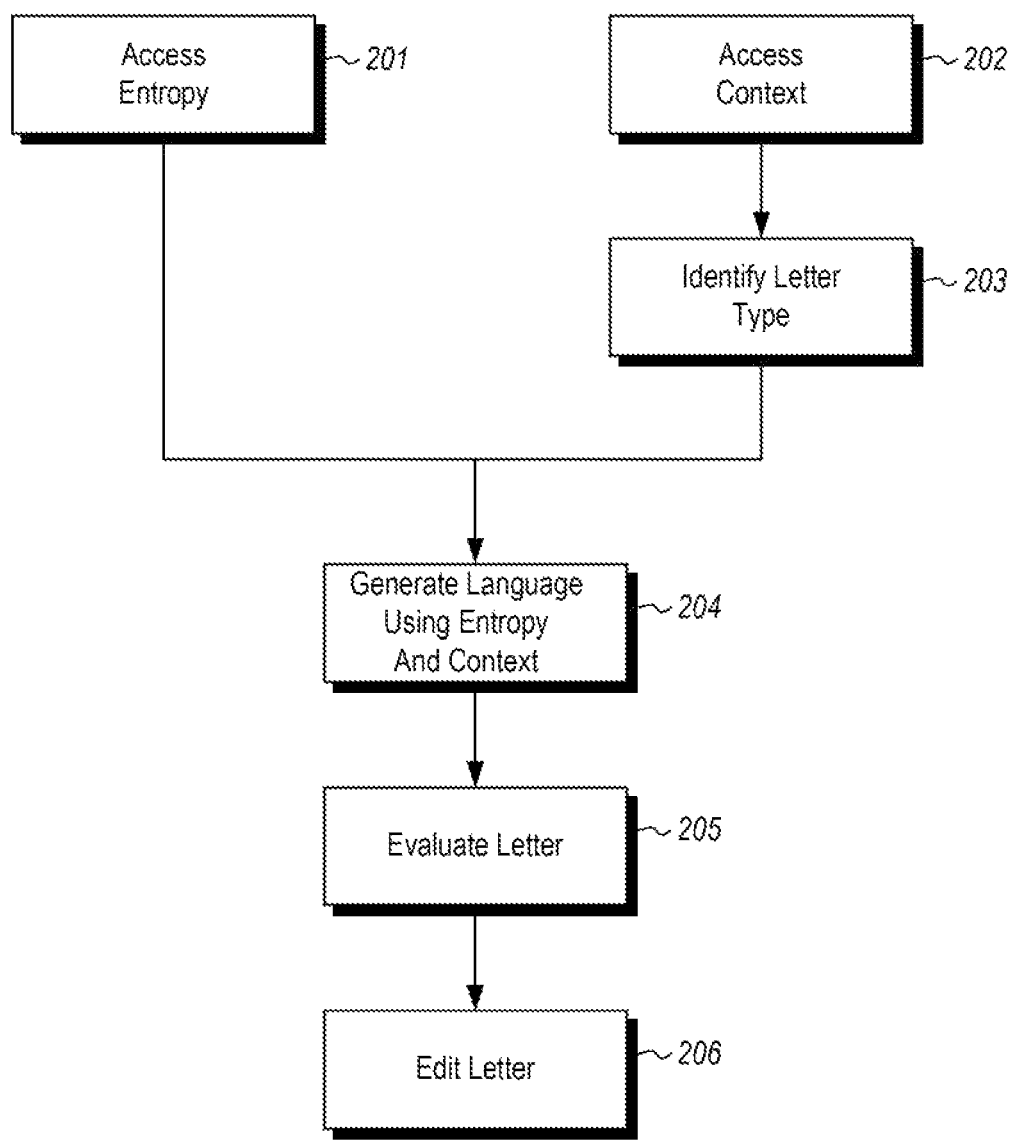
FIG. 2 illustrates a flowchart of a method for automatically generating a letter based on a context.

FIG. 2 illustrates a flowchart of a method 200 for automatically generating a letter based on one or more contextual variables representing a context for the letter. In this description and in the claims, a "letter" is any written correspondence, whether written on a tangible or computer-readable medium. For instance, a letter may be written correspondence having one or more paragraphs on one or more topics, and might be addressed to a specific entity.

The method 200 may be performed by, for example, the computing system of FIG. 1. The method 200 may be performed to generate multiple letters based on the same context variable(s). In that case, the method 200 may be performed multiple times sequentially for sequential generation of the letters. However, parallel processors may also be employed so that two or more of such letters may be generated concurrently. Time multiplexed processing may also be employed in which case a single processor may generate multiple letters substantially concurrently.

The letters that are generated are unique, even if the letters are based on an identical context. The computer-generated letters may be subsequently reviewed by a human for grammar, word choice or perhaps for content. Thus, the end result is a unique letter that appears to be entirely drafted by a human being, rather than computer-generated, even though little or no human effort was needed to generate the unique letter. Thus, many letters may be drafted in little time, with each letter having the appearance of being drafted by a human being. Entropy is introduced into the process to promote uniqueness in each letter even given the same context and purpose of the letter. For instance, entropy is introduced into the letter writing process by introducing pseudo-random number generation at a particular point in the letter writing process, and taking a different approach, path, or word choice for the letter writing depending on the outcome of the pseudo-random number generation. This kind of entropy may be introduced at multiple points and levels in the letter writing process.

Having a letter appear to be drafted entirely by a human being has certain advantages. The letter is not seen as a result of a mechanized process, but as a result of actual human effort, which implies that there is human psychological investment in the outcome of the letter. The reader naturally infers that further correspondence is likely if the written requests within the letter are not granted. This in turn increases the percentage chance that the recipient of the letter will empathize with its sender and take action in accordance with such requests. Simply put, a letter that appears to be written by a person, rather than a computer, is more likely to achieve the sender's desired results. Thus, such letters may be advantageous in a number of different contexts, and the principles described herein are not limited to any of these particular contexts.

As an example, the letter might be a letter authored for purposes of repairing credit. Such letters may be dispatched to credit bureaus and creditors in order to enforce their legal rights to inquire as to questionable or unclear credit report entries. However, the letter might also be a public relations letter dispatched to constituencies or stake holders in particular public matters. For instance, elected officials or those running for office may have personalized letters written to their constituencies and potential voters. Other example letters might be for the purpose of responding to an Internet posting, interacting with a customer regarding a complaint, reviewing a product, or the like.

The method 200 automatically generates letters by accessing entropy to be applied to the letter (act 201). Different entropy is input to each letter generation process to ensure that each letter is unique, even if the context for the letter is identical. For instance, pseudo-random functions may be used at different points of the letter writing process to determine the approach, path, or word choice to be used in the letter. The accessing of the entropy could be integrated with the remainder of the method 200, and in particular, may be integrated into the process of generating the language of the letter (act 204). For instance, different segments of entropy may be injected during execution by using randomization processes. Specific code examples showing this integration will be described in detail below.

In addition to accessing entropy, the method 200 accesses one or more contextual variables representing context for the letter (act 202). The accessing of the context could be integrated with the remainder of the method 200, and in particular, may be integrated into the process of generating the language of the letter (act 204). For instance, different segments of entropy may be injected during execution by using randomization processes.

Detailed examples of such context will be described further below. However, the context might include an explicit identification of a type of letter to generate. Alternatively, the context may be analyzed so that the computing system might automatically determine a letter type to send (act 203).

Language is then generated (act 204) for the letter in response to the context variable(s) such that the entropy causes the letter to be unique even given identical contextual variable(s) (act 204). The resulting letter may be evaluated (act 205), and further edited (act 206).

Figure 3:
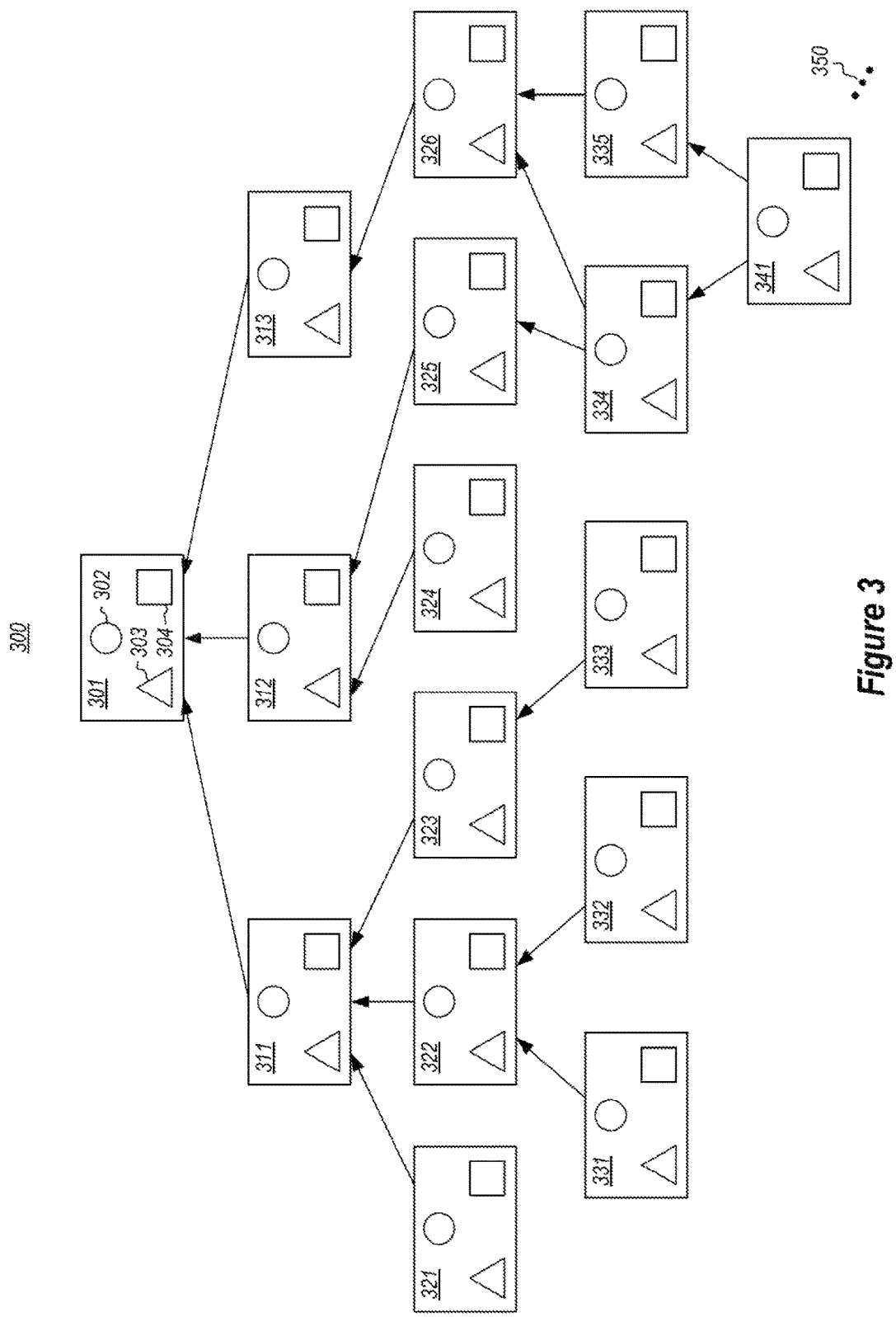
FIG. 3 illustrates a hierarchical structure code structure for generating language of the letter.

FIG. 3 illustrates a hierarchical structure code structure 300 for generating language of the letter. For instance, the code structure 300 may be used to perform act 204 in FIG. 3. The main component 301 of the hierarchical structure is responsible for compiling the largest components of the letter. For instance, the main component 301 will generate a letter than includes some, most, or even all of the following components: a header, salutation, introduction, request for action, conclusion, and signature block.

There is a set of rules 302 that governs whether inclusion of these components is optional or mandatory, and if there is mandatory ordering of the components. For instance, a header might not be included in all letters. However, a request for action might always be included. Furthermore, if an introduction and a request for action are both included, there might be a rule that the introduction is always included before the request for action. Another example is if a request for action and a conclusion are both included, there might be a rule that the conclusion always occurs before the request for action.

There may also be entropy 303 that is introduced into the main component. Such entropy might be any randomization or pseudo-randomization function in which different actions are performed based on randomized outcomes (e.g., equivalent to a rolling of the dice). For instance, there might be a randomization function that dictates that the header component is included 80% of the time, that the introduction is included 90% of the time, and that the conclusion is included 80% of the time. The randomization might be affected by context.

The main component may also access contextual variables 304 that affect how the language of the letter is generated. For instance, the contextual variables 304 might represent a certain tone, whether that tone be an aggressive tone, a mild tone, or something in between. The contextual variables might also represent a goal, purpose, or type of letter to be drafted.

The contextual variables 304 might represent attributes of the intended audience of the letter. For instance, if the intended audience is an attorney, a lay person, an administrative staff member, a government official, a credit bureau worker, a bank processor, a youth, an adult, or combinations of the above, that may affect the type of letter or the manner in which the letter is written. For instance, a letter to an attorney might be quite formalistic in grammar, style, and vocabulary, whereas a letter to a youth might be more casual in grammar, style, and vocabulary. Other attributes of the audience might be the age, education level, region of habitation, floridity level, and so forth.

The context 304 might also include attributes of the sender or the person on behalf of whom the letter is being sent (i.e., the simulated author of the letter). Such might be helpful if, for example, the intended audience of the letter is familiar with that sender or person on behalf of whom the letter is being sent either personally, or through prior written correspondence. In one embodiment, an executable component actually takes in samples of that person's writing, automatically evaluates the writing samples for commonly used words, phrases, grammar, and letter structure, so that the characteristics of the person's writing may be emulated in the automated letter generation. Alternatively or in addition, such evaluation might be performed by a human being. For instance, the human being might evaluate a questionnaire filled in by the simulated author, interact directly with the simulated author, evaluate writing samples of the simulated author, and the like, in order to determine attributes of the author, which may then be coded in proper form to be accessible by the code hierarchy 300. In one embodiment, the attributes of the simulated author may be derived at least in part by providing a user interface to the user through which the user answers questions.

In the symbolic usage of FIG. 3, the rules for construction for a given component in the hierarchical structure 300 are represented using a circle within the corresponding rectangle representing that component (e.g., reference circle 302 in main component 301). Also, the entropy used within the given component in the hierarchical structure 300 is represented using a triangle within the corresponding rectangle represented that given component (e.g., reference triangle 303 in main component 301). Finally, the context used within the given component in the hierarchical structure 300 is represented using a square within the corresponding rectangle represented that given component (e.g., reference square 304 in main component 301).

A glance on the other first tier code portions 311, 312, 313, second tier code portions 321 through 326, third tier code portion 331 through 335, and fourth tier code portion 341 reveals that each of the lower tier code portions may likewise be governed by respective rules (represented by the constituent circle), entropy (represented by the constituent triangle), and context (represented by the constituent square). Not all of the components need access entropy and context. However, the more places that entropy is introduced, and the greater the entropy introduced, the less risk there is that non-unique letters will be generated from the same context. The hierarchy is a bottom up design, where the lower level components feed their output into the upper level components as specified by the upward-facing arrows, in order to build up a letter.

In FIG. 3, a specific hierarchy is illustrated having particular numbers of first, second, third, and fourth tier code portions. However, the ellipses 350 represent great flexibility in the hierarchy, and that there may be any number of tiers in the hierarchy. The exact hierarchy will depend on the code drafter's experience and manner of drafting code, the type of letter to be drafted, the amount of recursion being performed, and complexity of the letter being drafted, and so forth. Accordingly, the principles described herein are not limited in the slightest upon the exact form of the code hierarchy used to generate the letter, as hierarchies will differ from letter to letter. Concrete code examples will be provided and explained below. However, for now, an example code hierarchy will be described abstractly with respect to FIG. 3.

In the particular example code portion 300, there are three first-tier components 311, 312 and 313. In general, the first tier components generate larger text components of the letter. Each higher tier component takes and assembles code portions received from lower tier components in response to rules and potentially also entropy and/or context, as previously mentioned. For instance, first tier code portion 311 receives smaller text portions constructed by each of second tier code portions 321, 322 and 323 and perhaps generates a larger text portion; first tier code portion 312 receives smaller text portions constructed by each of second tier code portions 324 and 325 and perhaps generates a larger text portion; and first tier code portion 313 receives a smaller text portion constructed by the second tier code portion 326 and generates a larger text portion.

Proceeding to the next tier, second tier code portion 322 receives smaller text portions constructed by each of third tier code portions 331 and 332, and perhaps generates a larger text portion than that produced by the third tier code portions 331 and 332. Second tier code portion 323 receives a text portion constructed by third tier code portion 333, and perhaps generates a relatively larger text portion. Second tier code portion 325 receives a text portion constructed by third tier code portion 334, and perhaps generates a relatively larger text portion. In addition, second tier code portion 326 receives text portions constructed by each of the third tier code portions 334 and 335, and perhaps generates a relatively larger text portion. For instance, the output of portion 311 might be a header, and the output of portion 312 might be the letter body, and the portion 313 might be the ending. In that case, portion 324 might represent a letter introduction, portion 325 might include a request for action portion, and the portion 326 might be a letter ending with a good will tone.

Note that the hierarchical structure may be highly complex. For instance, third tier code portion 334 feeds text portions to both of second tier portions 325 and 326. Furthermore, fourth tier code portion 341 feeds text portions to both of third tier portions 334 and 335. Thus a lower tier component may feed text multiple, and perhaps numerous, upper tier components. Furthermore, there may be considerable recursion that occurs. In addition, the hierarchical structure may be constantly changing depending on entropy and/or context at upper tier components.

The leaf nodes in this hierarchical structure are those nodes that are not fed any text by lower tier code portions. For instance, in FIG. 3, code portions 321, 331, 332, 333, 324 and 341 are leaf code portions. In one embodiment, such leaf code portions may select from any number of words or phrases. For instance, the leaf code might select from a dictionary of similar words. Such selection may involve some randomness (i.e., entropy) and may also be influenced by the context. For instance, contexts suggesting greater education levels might be weighed towards more elaborate vocabulary choices. Furthermore, a modifier clause might be added to nominal phrase or nouns with greater probability of modifier usage depending on the context, and with stronger modifiers if the tone is to be aggressive.

Specific example code portions will now be described as examples only. The principles described herein are not limited to such examples, but are instead, defined by the claims. Nevertheless, specific examples can help solidify understanding and are thus liberally provided. Consider the following example, with line numbering added for clarity:

```
1.  switch (the random of (2))
2.    case 1
3.      put getXAsaloyalcustomer( ) & ", " after thePhrase
4.      put "I" && getXhavemaintained( ) && getXmyaccount( ) &&
          getXingoodstanding( ) & ". " after thePhrase
5.    break
6.    case 2
7.      put "I" && getXhavebeen( ) && getXanaccountholder( ) &&
          getXforquitesometime( ) after thePhrase
8.      if the random of (10)<6 then
9.        put " and" && getXhavemaintained() && getXmyaccount( )
          &&
            getXingoodstanding( ) after thePhrase
10.     if the random of (10)>5 then
11.       put " " & getXformostofthattime( ) & ". " after thePhrase
```

-continued

```
12.      else
13.           put ". " after thePhrase
14.      end if
15.      else
16.           if the random of (10)<7 then
17.                put " and am" && getXconcerned( ) && getXsomething(
    )
                   & ".
                   " after thePhrase
18.           else
19.                put ". " after thePhrase
20.           end if
21.      end if
22. break
23.      default
24.      break
25. end switch
```

Reviewing this example, there are 25 lines of code. Line 1 includes a switch operator which randomly chooses between integers 1 or 2. This represents the injection of entropy into the component. If the integer 1 is randomly chosen by the switch operator, then the code for case 1 is executed (corresponding to lines 2 through 5). If the integer 2 is randomly chosen by the switch operating, then the code for case 2 is executed (corresponding to lines 6 through 22). Rather than a strictly random choice, the dice may be weighted, so to speak, in response to context. For instance, the component may be recrafted such that the chance of case 1 increases in some contexts, and decreases in other contexts.

Reviewing case 1 (from lines 2 through 5), line 3 puts whatever text is returned by the function getXAsaloyalcustomer, concatenates that string with a comma and a space, and then adds the resulting concatenation to the end of a string represented by the variable called "thePhrase".

The variable "thePhrase" is a temporary memory location that stores the accumulated text so far at this point in executing the code. Thus, even before the 25 line code segment is executed, other code may have already accumulated some text. The function getXAsaloyalcustomer provides some text string that might include "As a loyal customer" or some other close equivalent such as "I have been with your company for several years now", "I have been a customer for some time", "We have had a long and prosperous business history with each other", and so forth with perhaps thousands or millions of possible text output permutations facilitated by the components positioned in lower in the code hierarchy and by the entropy injected into that function and the functions from which it directly or indirectly receives text.

Line 4 concatenates the text "I" with the outputs from function getXhavemaintained, getXmyaccount, and getXisgoodstanding and further concatenates a period ".", and further adds the resulting string to the end of the string variable thePhrase. Again, each of these three functions may have enumerable possible text output depending on the entropy and context provided at or lower than the corresponding function in the code hierarchy.

The code executed in response to case 2 (lines 6 through 22) will now be described. Lines 6 and 22 define the boundaries for case 2.

Line 7 concatenates the text "I" with the outputs from function getXhavebeen, getXanaccountholder, and getXforquitesometime and further concatenates a period ".", and further adds the resulting string to the end of the string variable thePhrase. Again, each of these three functions may have enumerable possible text output depending on the entropy and context provided at or lower than the corresponding function in the code hierarchy.

Line 8 adds further entropy (a second level of entropy) to the process by randomly selecting an integer from 1 to 10, inclusive. If an integer from 1 through 5 is randomly selected in line 8, then lines 9 through 14 are executed. Note that this randomization could again be affected by context such that the division line between the "if" and "else" statement is placed at some other position (e.g., between 7 and 8, rather than between 5 and 6).

Line 9 concatenates the text "and" with the outputs from functions getXhavemaintained, getXmyaccount, and getXingoodstanding, and further adds the resulting string to the end of the string variable thePhrase. Again, each of these three functions may have enumerable possible text output depending on the entropy and context provided at or lower than the corresponding function in the code hierarchy.

Line 10 adds a third level of entropy by again randomly selecting an integer between 1 and 10, inclusive. If line 10 selects an integer from 6 through 10, then line 11 is executed. Otherwise, line 13 is executed. Line 11 involves adding the following string to the end of the string variable thePhrase: a string resulting from concatenating a space with the text output from the function getXformostofthattime and with a period "." If line 10 selects an integer from 1 to 5, the else at line 12 branches to instead cause line 13 to be executed. Line 13 merely adds a period to the end of the string thePhrase.

Returning to the second level of entropy determined in line 8. If the second level of entropy in line 8 chose instead an integer from 6 to 10, the else operator in line 15 triggers execution of the code from lines 16 through 20.

In line 16, another random selection of an integer from 1 to 10 is made. If the selected integer in line 16 is from 1 to 6, inclusive, line 17 is executed, and the following string is added to the end of the string variable thePhrase: "and am" concatenated with the text output from the function getXconcerned and further with the text output from the function getXsomething, and further with a period and a space. Otherwise, if the selected integer in line 16 is from 7 to 10, includes, line 19 is executed in which a period and a space are added to the string variable thePhrase.

The end result of executing lines 1 through 25 along with its various called functions, allows for a number of unique sentences to be constructed. Such text output may be fed further up the code hierarchy until the entire letter is constructed.

The following represents another example of how text could be generated. Here, the code associated with the main function and a number of constituent functions are illustrated.

```
on mouseUp
    put getverbphrase( ) into thePhrase
    if random(10)<7 then
        put " the " after thePhrase
        if random(10)<7 then
            put getmod1phrase( ) & " " after thePhrase
        end if
        put getnounphrase( ) after thePhrase
    else
        put getnoun( ) after thePhrase
    end if
    put thePhrase into cd fld "output"
end mouseUp
```

Example Functions

```
function getverbphrase
   global vnum
   return line (random(vnum)) of cd fld "verbs"
end getverbphrase
function getmod1phrase
   global m1 num
   put line (random(m1 num)) of cd fld "modifiers type 1" into theStr
   if random(10)<3 then
      get getmod1phrase( )
      -- recurs
         if it<>last word of theStr then
            put " and " &it after theStr
         end if
      end if
   return word 1 to 3 of theStr
end getmod1phrase
function getmod2phrase
   global m2num,recurs
   if random(10)<5 then
      put getadverb( ) into theStr
   end if
   put line (random(m2num)) of cd fld "modifiers type 2" after theStr
   if random(10)<3 and recurs is false then
      put true into recurs
      get getmod2phrase( )
      if last word of it<>last word of theStr then
         put " and " &it after theStr
      end if
   end if
   return theStr
end getmod2phrase
function getadverb
   global m1num
   return line(random(m1num)) of cd fld "modifiers type 1" & "ly "
end getadverb
function getnounphrase
   global npnum
   put line (random(npnum)) of cd fld "Noun Phrases" into theStr
   repeat forever
      put offset ("n",theStr) into needanoun
      if needanoun is 0 then
         exit repeat
      else
         delete char needanoun of theStr
         delete char needanoun of theStr
         put getnoun( ) into thenoun
         if length(theStr)-needanoun>1 and number of words of thenoun>1
         then
            delete last char of thenoun
            put "," after thenoun
         end if
         put thenoun after char needanoun of theStr
      end if
   end repeat
   return theStr
end getnounphrase
function getnoun
   global nnum,recurs
   put false into recurs
   if random(10)<7 then
      put getmod2phrase( ) &" " into theStr
   end if
   put line (random(nnum)) of cd fld "Nouns" & " " after theStr
   return theStr
end getnoun
```

In this example, the main function is executed upon detecting a mouse up event. For instance, the user might have just selected a control in the user interface which activated the text generation process. However, the main function might be automatically executed without responding to any particular event. Here, a number of features are shown. Specifically, there are recursion operations. For instance, the function getmod1phrase includes a recursive call to an instance of itself. However, there are limits to the recursion. For instance, the variable recurs defines whether or not execution is already in recursion, and if so, there is no further recursion. Also, rather than select from a fixed number of words, the variables vnum, m1num, m2num, npnum, and nnum define the number of possible selections from respective string arrays "verbs", "modifiers type 1", "modifiers type 2", and "noun phrases", and "Nouns", respectively. For instance, the string arrays "verbs" might include words such as "help", "assist", "support", "aid" and the like. The string "modifiers type 1" might include modifiers such as "extremely", "very", "quite", and so forth.

Figure 4:
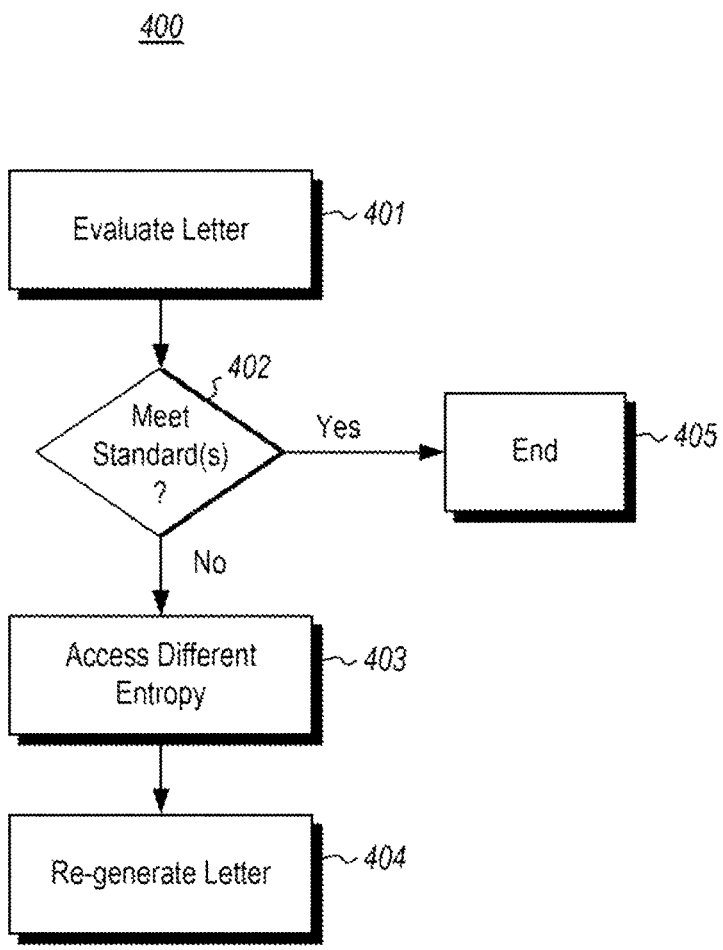
FIG. 4 illustrates an example of a method for post processing of the generated letter.

However, recall again that these specific code examples are just examples only, and are not intended to limit the principles described herein in any way. Accordingly, the principles described herein provide an effective, context-sensitive way to automatically generate a first draft of a letter. As described with respect to FIG. 4, all or portions of the first draft may be regenerated after comparing to certain standards. Accordingly, FIG. 4 illustrates an example of a method 400 for post processing of the generated letter. FIG. 4 is also an example of the evaluation act 205 in FIG. 2.

The letter is first evaluated (act 401) to determine whether or not the generated letter meets a particular standard (decision block 402). This standard may be set by a user and/or may be generated by a computing system. The evaluation may also be performed by a human, though a computing system may also perform the evaluation automatically, and perhaps assign a grade or other quality metric to the generated letter.

If the letter meets the standard ("Yes" in decision block 402), then the method ends (act 405). Otherwise, if all or a portion of the letter is below the standard ("No" in decision block 402), then all or a portion of the letter is regenerated. Specifically, all or a portion of the letter is re-generated by accessing different entropy than before (act 403), and then re-generating that letter or the relevant portion with the different entropy (act 404) to thereby repeat act 204 in FIG. 2. If the accessing of the entropy is integrated with the generation of the letter, as in the above code examples, then this simply means re-running that portion of the code responsible for generating the substandard portion of the letter. Thus, the automated or manual review may involve throwing output away, modifying, regenerating, or accepting the output of a code portion as is.

Accordingly, an efficient mechanism for automatically generating contextually relevant and unique letters has been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method that causes a computing system to generate a letter, the computing system comprising one or more processors and a memory storing the following: (a) a first plurality of text strings, each suitable for use in at least a first portion of a salutation in the letter, (b) a second plurality of text strings, each suitable for use in at least a first portion of a request for action in the letter, and (c) a third plurality of text strings, each suitable for use in at least a first portion of a signature block in the letter, the computing system also storing computer-executable instructions that are executed by the one or more processors of the computing system for causing the computing system to perform the method, the method comprising:

generating a first random number;

selecting, based on the first random number, one text string from the first plurality of text strings;

generating a second random number;

selecting, based on the second random number, one text string from the second plurality of text strings;

generating a third random number;

selecting, based on the third random number, one text string from the third plurality of text strings;

obtaining a first set of rules that defines a mandatory ordering for each portion and each sub-portion of the following letter portions: (a) the salutation of the letter, (b) the request for action in the letter, and (c) the signature block of the letter, the first set of rules governing a recursive construction of the letter such that construction of subsequent portions of the letter are at least partially determined by one or more earlier portions of the letter; and generating the letter using at least the one text string selected from the first plurality of text strings, the one text string selected from the second plurality of text strings, and the one text string selected from the third plurality of text strings, wherein generating the letter is performed by evaluating the first set of rules against each of the following: (a) the one text string selected from the first plurality of text strings, (b) the one text string selected from the second plurality of text strings, and (c) the one text string selected from the third plurality of text strings, whereby the letter is recursively constructed by evaluating the first set of rules against various different selected portions of text strings.

2. The method of claim 1, wherein the memory further stores a fourth plurality of text strings, each suitable for use in at least a portion of a heading in a letter, the method further comprising:

generating a fourth random number;

deciding, based on the fourth random number, whether to include a heading in the letter;

if there is a decision to include a heading in the letter:
        generating a fifth random number;
        selecting, based on the fifth random number, one text string from the fourth plurality of text strings; and
        generating the letter also using the one text string selected from the fourth plurality of text strings.

3. The method of claim 2, wherein there is a decision to include a heading in the letter at least 80% of the time.

4. The method of claim 1, wherein the memory further stores a fourth plurality of text strings, each suitable for use in at least a second portion of a salutation in a letter, the method further comprising:

generating a fourth random number;

selecting, based on the fourth random number, one text string from the fourth plurality of text strings; and generating the letter also using the one text string selected from the fourth plurality of text strings.

5. The method of claim 1, wherein the memory further stores a fourth plurality of text strings, each suitable for use in at least a second portion of a request for action in a letter, the method further comprising:

generating a fourth random number;

selecting, based on the fourth random number, one text string from the fourth plurality of text strings; and generating the letter also using the one text string selected from the fourth plurality of text strings.

6. The method of claim 5, wherein said one text string from the first plurality of text strings is selected from the first plurality of text strings also based on a contextual variable, said one text string from the second plurality of text strings is selected from the second plurality of text strings also based on the contextual variable, said one text string from the third plurality of text strings is selected from the third plurality of text strings also based on the contextual variable, and/or said one text string from the fourth plurality of text strings is selected from the fourth plurality of text strings also based on the contextual variable.

7. The method of claim 6 wherein the contextual variable represents a tone for the letter, an intended audience for the letter, an attribute of a person on behalf of whom the letter is being generated, or a type of the letter.

8. The method of claim 5, wherein there are sufficient numbers of text strings in the first plurality of text strings, the second plurality of text strings, the third plurality of text strings, and the fourth plurality of strings so that said step of generating said letter is capable of generating one of at least a thousand permutations of letters.

9. The method of claim 1, wherein the memory further stores a fourth plurality of text strings, each suitable for use in at least a second portion of a signature block in a letter, the method further comprising:

generating a fourth random number;

selecting, based on the fourth random number, one text string from the fourth plurality of text strings; and generating the letter also using the one text string selected from the fourth plurality of text strings.

10. The method of claim 1, wherein said one text string from the first plurality of text strings is selected from the first plurality of text strings also based on a contextual variable, said one text string from the second plurality of text strings is selected from the second plurality of text strings also based on the contextual variable, and/or said one text string from the third plurality of text strings is selected from the third plurality of text strings also based on the contextual variable.

11. The method of claim 10 wherein the contextual variable represents a tone for the letter.

12. The method of claim 10 wherein the contextual variable represents an intended audience for the letter.

13. The method of claim 10 wherein the contextual variable represents an attribute of a person on behalf of whom the letter is being generated.

14. The method of claim 10 wherein the contextual variable represents a type of the letter.

15. The method of claim 14 wherein the type of the letter is a credit repair letter.

16. The method of claim 1, wherein the memory further stores (a) a fourth plurality of text strings, each suitable for use in a header of a letter, (b) a fifth plurality of text strings, each suitable for use in an introduction of a letter, (c) a sixth plurality of text strings, each suitable for use in a conclusion of a letter, the method further comprising:

generating a fourth random number;

selecting, based on the fourth random number, one text string from the fourth plurality of text strings;

generating a fifth random number;

selecting, based on the fifth random number, one text string from the fifth plurality of text strings;

generating a sixth random number;

selecting, based on the sixth random number, one text string from the sixth plurality of text strings; and generating the letter also using the one text string selected from the fourth plurality of text strings, the one text string selected from the fifth plurality of text strings, and the one text string selected from the sixth plurality of text strings.

17. The method of claim 1, wherein there are sufficient numbers of text strings in the first plurality of text strings, the second plurality of text strings, and the third plurality of text strings so that said step of generating said letter is capable of generating one of at least a thousand permutations of letters.

18. The method of claim 1, wherein there are sufficient numbers of text strings in the first plurality of text strings, the second plurality of text strings, and the third plurality of text strings so that said step of generating said letter is capable of generating one of at least a million permutations of letters.

19. A computing system to generate a letter, the computing system comprising:
one or more processors;
a memory storing the following:
(a) a first plurality of text strings, each suitable for use in at least a first portion of a salutation in the letter;
(b) a second plurality of text strings, each suitable for use in at least a first portion of a request for action in the letter; and
(c) a third plurality of text strings, each suitable for use in at least a first portion of a signature block in the letter; and
one or more computer-readable media having thereon one or more computer-executable instructions that are executable by the one or more processors to cause the one or more processors to perform a method comprising:
generating a first random number;
selecting, based on the first random number, one text string from the first plurality of text strings;
generating a second random number;
selecting, based on the second random number, one text string from the second plurality of text strings;
generating a third random number;
selecting, based on the third random number, one text string from the third plurality of text strings;
obtaining a first set of rules that defines a mandatory ordering for each portion and each sub-portion of the following letter portions: (a) the salutation of the letter, (b) the request for action in the letter, and (c) the signature block of the letter, the first set of rules governing a recursive construction of the letter such that construction of subsequent portions of the letter are at least partially determined by one or more earlier portions of the letter; and
generating the letter using at least the one text string selected from the first plurality of text strings, the one text string selected from the second plurality of text strings, and the one text string selected from the third plurality of text strings, wherein generating the letter is performed by evaluating the first set of rules against each of the following: (a) the one text string selected from the first plurality of text strings, (b) the one text string selected from the second plurality of text strings, and (c) the one text string selected from the third plurality of text strings, whereby the letter is recursively constructed by evaluating the first set of rules against various different selected portions of text strings.

20. A computer-implemented method that causes a computing system to generate a letter that appears to be drafted by a human, the computing system comprising one or more processors and a memory storing the following: (a) a first plurality of text strings, each suitable for use in a first portion of the letter, (b) a second plurality of text strings, each suitable for use in a second portion of the letter, (c) a third plurality of text strings, each suitable for use in a third portion of the letter, (d) a fourth plurality of text strings, each suitable for use in a fourth portion of the letter, (e) a fifth plurality of text strings, each suitable for use in a fifth portion of the letter, and (f) a sixth plurality of text strings, each suitable for use in a sixth portion of the letter, the computing system also storing computer-executable instructions that are executed by the one or more processors of the computing system for causing the computing system to perform the method comprising:
generating a first random number;
selecting, based on the first random number, one text string from the first plurality of text strings;
generating a second random number;
selecting, based on the second random number, one text string from the second plurality of text strings;
generating a third random number;
selecting, based on the third random number, one text string from the third plurality of text strings;
generating a fourth random number;
selecting, based on the fourth random number, one text string from the fourth plurality of text strings;
generating a fifth random number;
selecting, based on the fifth random number, one text string from the fifth plurality of text strings;
generating a sixth random number;
selecting, based on the sixth random number, one text string from the sixth plurality of text strings;
obtaining a first set of rules that defines a mandatory ordering for each portion and each sub-portion of the following letter portions: (a) the first portion of the letter, (b) the second portion of the letter, (c) the third portion of the letter, (d) the fourth portion of the letter, (e) the fifth portion of the letter, and (f) the sixth portion of the letter, the first set of rules governing a recursive construction of the letter such that construction of subsequent portions of the letter are at least partially determined by one or more earlier portions of the letter; and
generating the letter using at least the one text string selected from the first plurality of text strings, the one text string selected from the second plurality of text strings, the one text string selected from the third plurality of text strings, the one text string selected from the fourth plurality of text strings, the one text string selected from the fifth plurality of text strings, and the one text string selected from the sixth plurality of text strings, wherein generating the letter is performed by evaluating the first set of rules against each of the following: (a) the one text string selected from the first plurality of text strings, (b) the one text string selected from the second plurality of text strings, (c) the one text string selected from the third plurality of text strings, (d) the one text string selected from the fourth plurality of text strings, (e) the one text string selected from the fifth plurality of text strings, and (f) the one text string selected from the sixth plurality of text strings, whereby the letter is recursively constructed by evaluating the first set of rules against various different selected portions of text strings.

\* \* \* \* \*

UNITED STATES PATENT AND TRADEMARK OFFICE
CERTIFICATE OF CORRECTION

PATENT NO. : 10,114,798 B2  
APPLICATION NO. : 13/772174  
DATED : October 30, 2018  
INVENTOR(S) : Justin Randall Padawer Page 1 of 1

It is certified that error appears in the above-identified patent and that said Letters Patent is hereby corrected as shown below:

In the Specification

Column 3
Line 64, delete second instance of "or"

Column 9
Line 47, delete "in"

Column 10
Line 43, change "includes" to -inclusive-

Signed and Sealed this
Sixteenth Day of July, 2019

Andrei Iancu
*Director of the United States Patent and Trademark Office*